United States Patent [19]

Magyar

[11] Patent Number: 5,984,412
[45] Date of Patent: Nov. 16, 1999

[54] LINEAR RECLINER

[75] Inventor: Joseph J. Magyar, Fenton, Mich.

[73] Assignee: Magna Lomason Corporation, Farmington Hills, Mich.

[21] Appl. No.: 09/112,987

[22] Filed: Jul. 10, 1998

Related U.S. Application Data

[60] Provisional application No. 60/052,815, Jul. 10, 1997.

[51] Int. Cl.⁶ .................................................... B60N 2/02
[52] U.S. Cl. ...................................... 297/362.12; 297/367
[58] Field of Search .............................. 297/362.12, 367, 297/375, 353, 354.1, 361.1

[56] References Cited

U.S. PATENT DOCUMENTS 5,718,482  2/1998  Robinson ....................... 297/362.12 X

FOREIGN PATENT DOCUMENTS

522939  1/1993  European Pat. Off. .......... 297/362.12
636325  3/1962  Italy ................................. 297/362.12

*Primary Examiner*—Milton Nelson, Jr.
*Attorney, Agent, or Firm*—Pillsbury Madison & Sutro LLP

[57] ABSTRACT

A linear recliner assembly for use with a vehicle seat assembly. The vehicle seat assembly has a seat cushion and a seat back pivotally mounted to the seat cushion for forward and rearward reclining movement. The linear recliner assembly has a housing mounted to the seat cushion. An actuating rod is pivotally connected to the seat back at a first end thereof and slidably mounted with the housing at an opposite end thereof. The actuating rod is biased to urge the seat back to the forward reclining movement. A pivotally mounted pawl is biased into pivotal engagement with the actuating rod. A rotatable camming member engages the pawl in a camming relationship so as to move the pawl between a releasably engaged position engaging the actuating rod preventing reclining movement and a released position disengaging the actuating rod mechanism allowing reclining movement. The pawl engages the actuating rod such that when a force applied to the seat back the force is transmitted to the seat cushion through the camming member.

5 Claims, 8 Drawing Sheets

Fig. 10 ns and inventions.

LINEAR RECLINER

This application claims the benefit of U.S. Provisional Application Ser. No. 60/052,815, filed Jul. 10, 1997.

FIELD OF INVENTION

The present invention relates to a linear recliner assembly for use with reclining vehicle seat assemblies. The present invention also relates to reclining vehicle seat assemblies having a linear recliner assembly.

BACKGROUND OF INVENTION

In many conventional reclining vehicle seats, the seat back is pivotally mounted for forward and rearward reclining movement by virtue of a linear recliner assembly which is connected to the seat. The typical linear recliner assembly, as exemplified in U.S. Pat. Nos. 4,898,424 and 5,718,482, has a housing mounted to the side of the seat and an actuating rod mounted for linear movement within the housing and connected to a lower portion of the seat back. A locking mechanism is mounted within the housing and engages the actuating rod to prevent reclining movement of the seat back.

Under certain conditions, such as a collision, a substantial force may be applied to the seat back so as to result in a longitudinally directed force being applied to the actuating rod and transmitted to the seat through the pivot pin of the locking mechanism. The pivot pin is thus required to be of high strength material, with the attendant increased costs, in order to resist such forces. Thus, there exists a need to provide a recliner assembly which avoids transferring forces through a single pivot pin.

SUMMARY OF INVENTION

It is therefore an object of the present invention to provide a linear recliner assembly which is designed to provide better force transmission from the seat back to the seat and to reduce or minimize the amount of component damage which can occur as a result of such force transmission. In accordance with the principles of the present invention, there is provided a vehicle seat assembly comprising a seat and a seat back. The seat back is pivotally mounted to the seat for pivotal forward and rearward reclining movement relative to the seat.

According to one aspect of the invention, there is provided a linear recliner assembly for use with a vehicle seat assembly. The vehicle seat assembly has a seat cushion and a seat back pivotally mounted to the seat cushion for forward and rearward reclining movement. The linear recliner assembly has a housing mounted to the seat cushion. An actuating rod is pivotally connected to the seat back at a first end thereof and slidably mounted with the housing at an opposite end thereof. The actuating rod is biased to urge the seat back to the forward reclining movement. A pivotally mounted pawl is biased into pivotal engagement with the actuating rod. A rotatable camming member engages the pawl in a camming relationship so as to move the pawl between a releasably engaged position engaging the actuating rod preventing reclining movement and a released position disengaging the actuating rod mechanism allowing reclining movement. The pawl engages the actuating rod such that when a force applied to the seat back the force is transmitted to the seat cushion through the camming member.

DETAILED DESCRIPTION OF THE INVENTION

Figure 1:
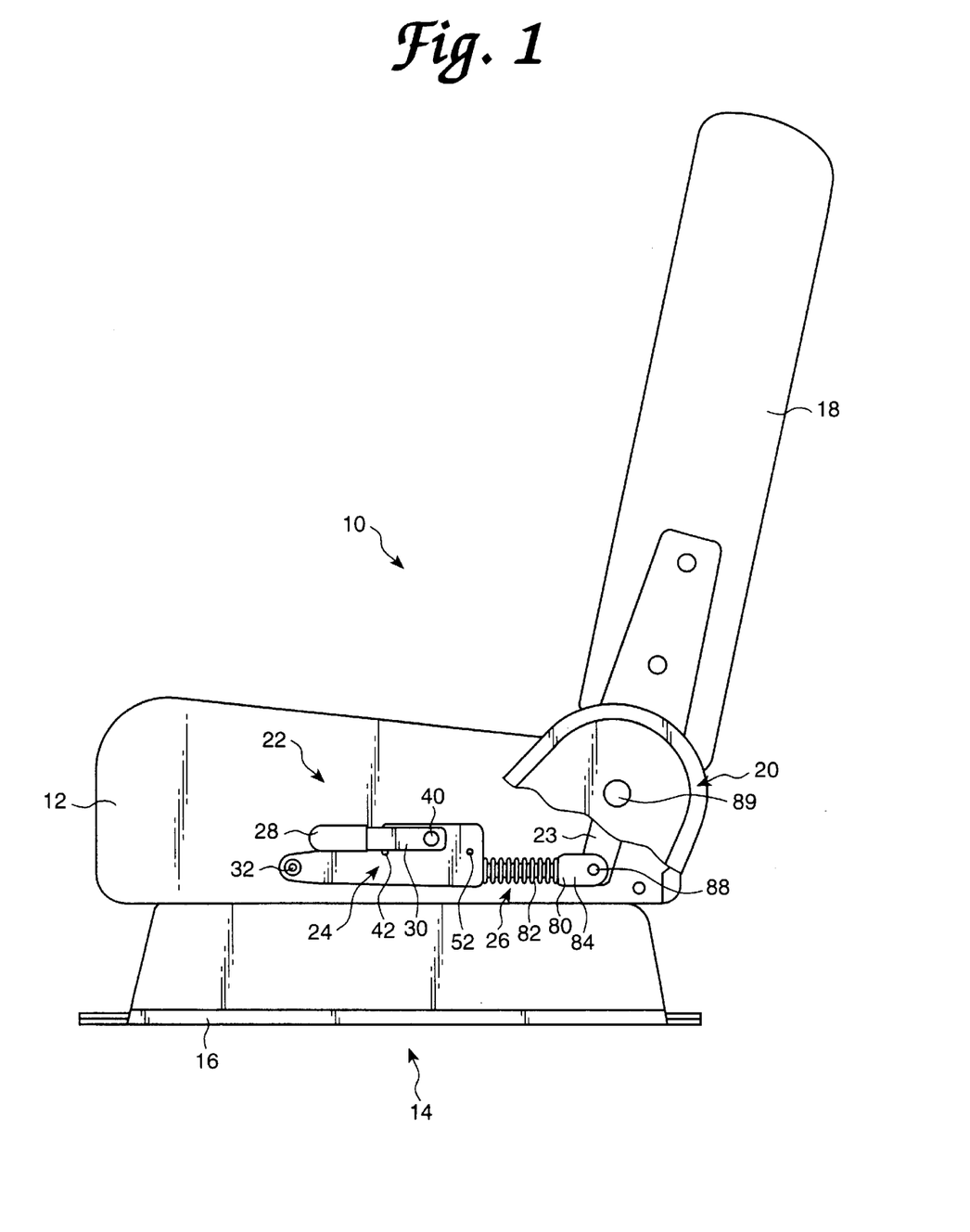
FIG. 1 of the drawings illustrates an embodiment of the present invention showing an elevated side view of a vehicle seat assembly having a linear recliner assembly constructed in accordance with the principles of the present invention with a proximal side cover partially removed to reveal the operating components.

Referring now more particularly to FIG. 1 of the drawings, there is shown in FIG. 1 thereof, a vehicle seat assembly generally indicated at 10, embodying the principles of the present invention. The seat assembly 10 includes a seat cushion 12 which mounts the seat assembly 10 in any conventional fashion on the vehicle floor, schematically illustrated at 14 in FIG. 1. The seat cushion 12 supports an occupant seated thereon when the vehicle seat assembly 10 is mounted in an operative position on the floor 14 of the vehicle. As shown, a set of track assemblies 16 serves to mount the seat cushion 12 on the vehicle floor 14 for fore and aft adjustment movements.

The seat assembly 10 also includes a seat back 18 which is mounted on the seat cushion 12 by a suitable type of recliner assembly, generally indicated at 20, which is actuated in accordance with the principles of the present invention by a linear actuator assembly, generally indicated at 22. The seat back 18 supports the back of an occupant seated on the seat cushion 12. The actuator assembly 22 connects to a movable seat back arm member 23 in the seat back 18 through which pivotal forward and rearward reclining movement of the seat back 18 relative to the seat cushion 12 is effected.

Figure 2:
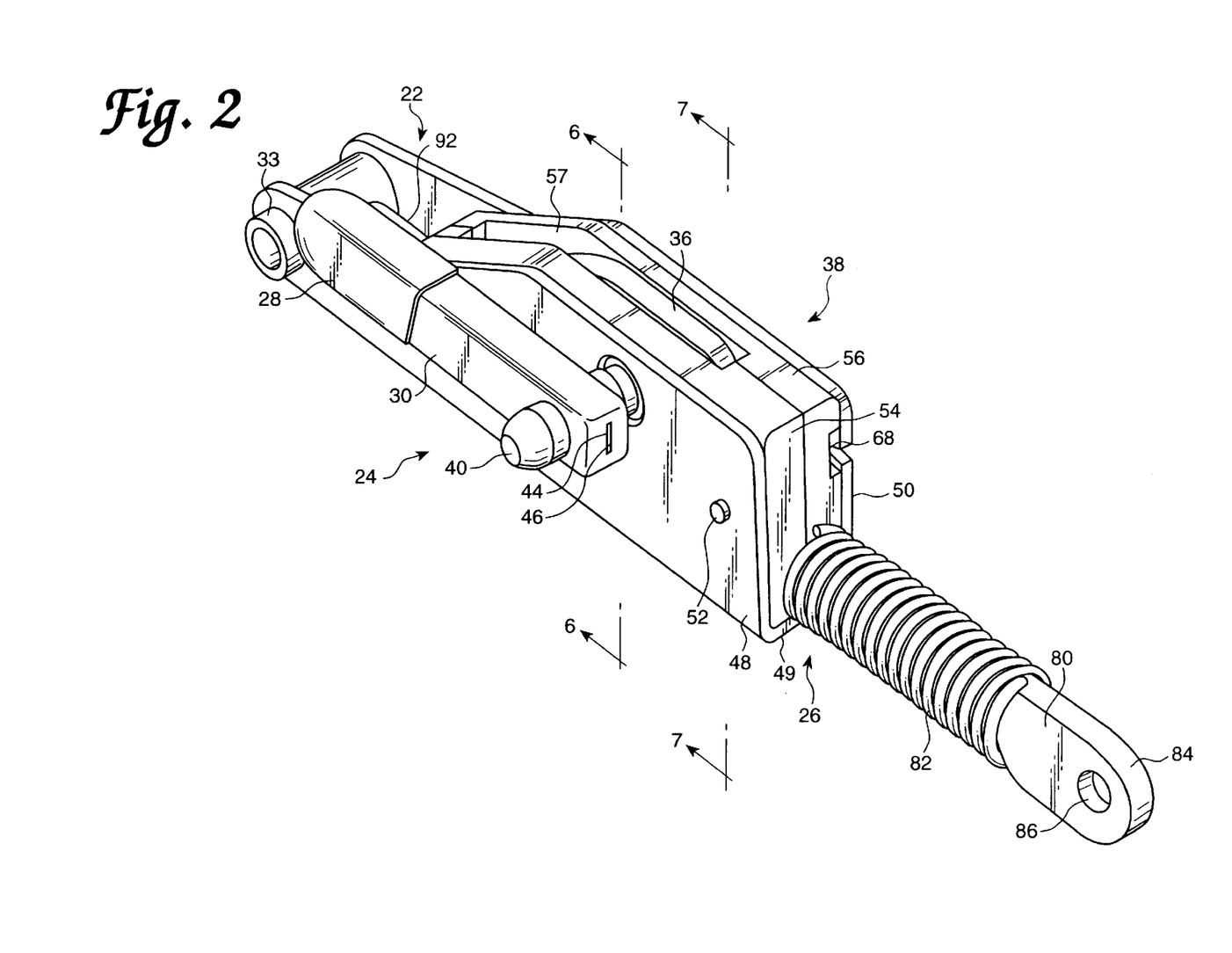
FIG. 2 of the drawings is a left side perspective view of the linear recliner assembly.
Figure 3:
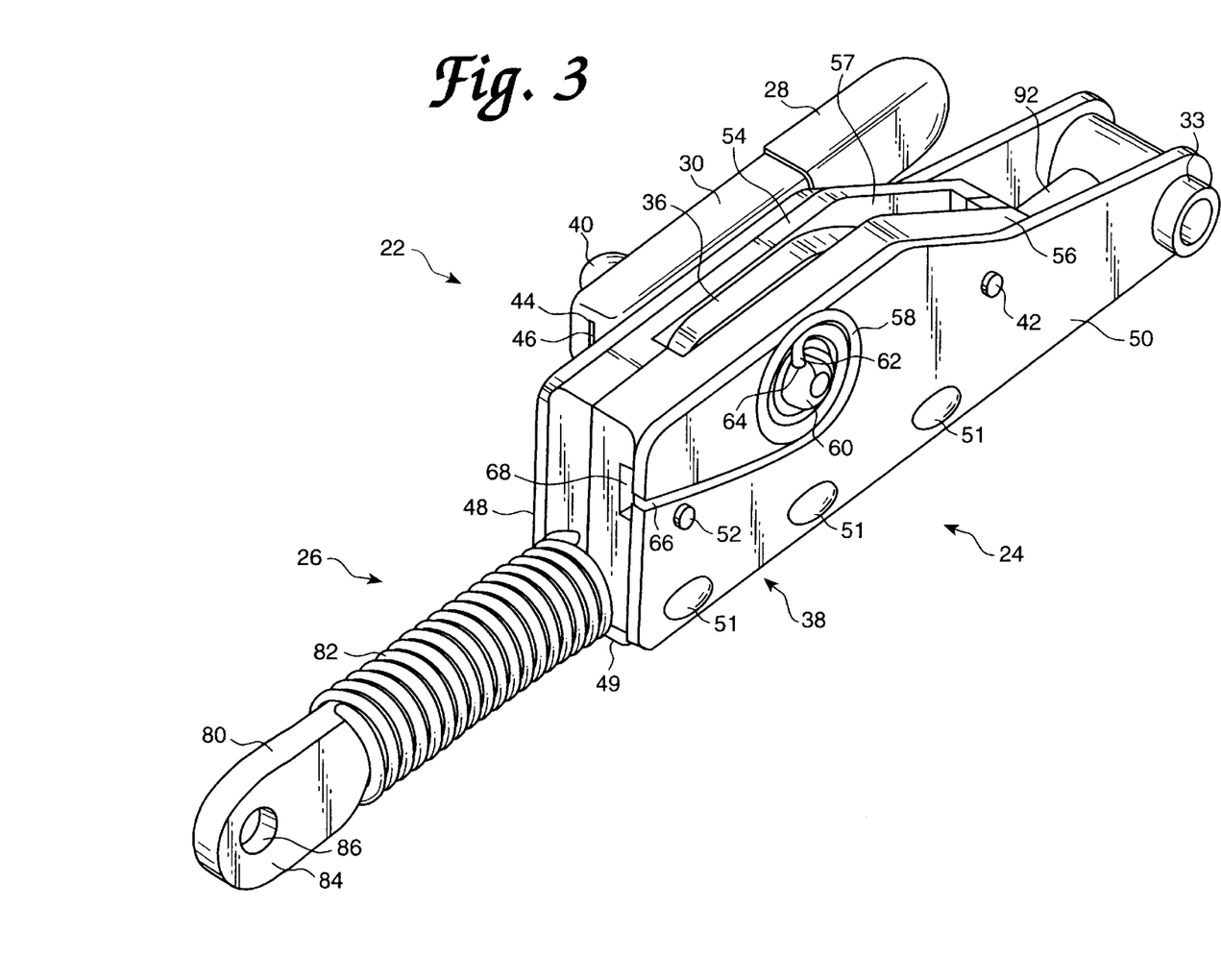
FIG. 3 of the drawings is a right side perspective view of the linear recliner assembly.
Figure 4:
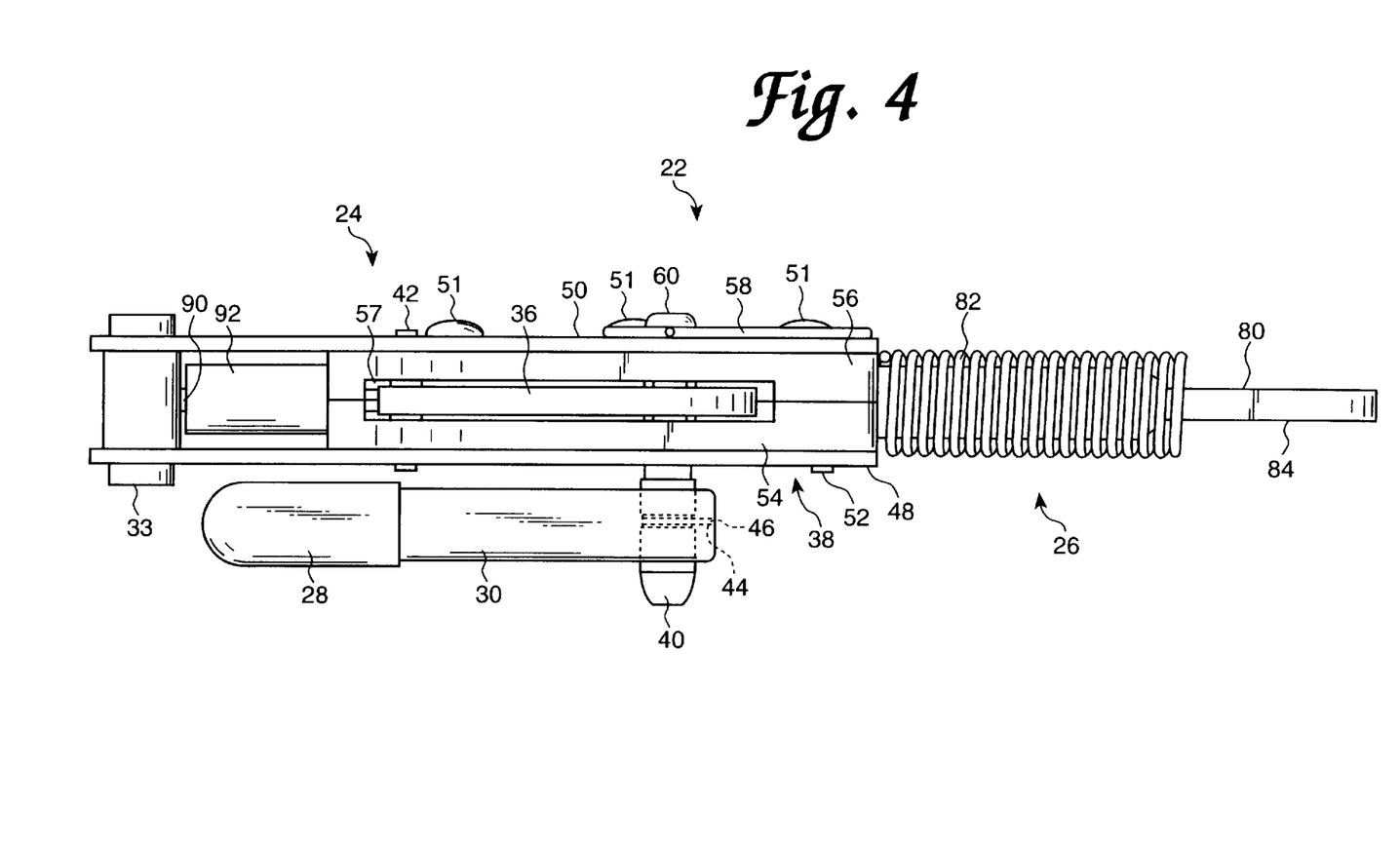
FIG. 4 of the drawings is a top view of the linear recliner assembly.
Figure 5:
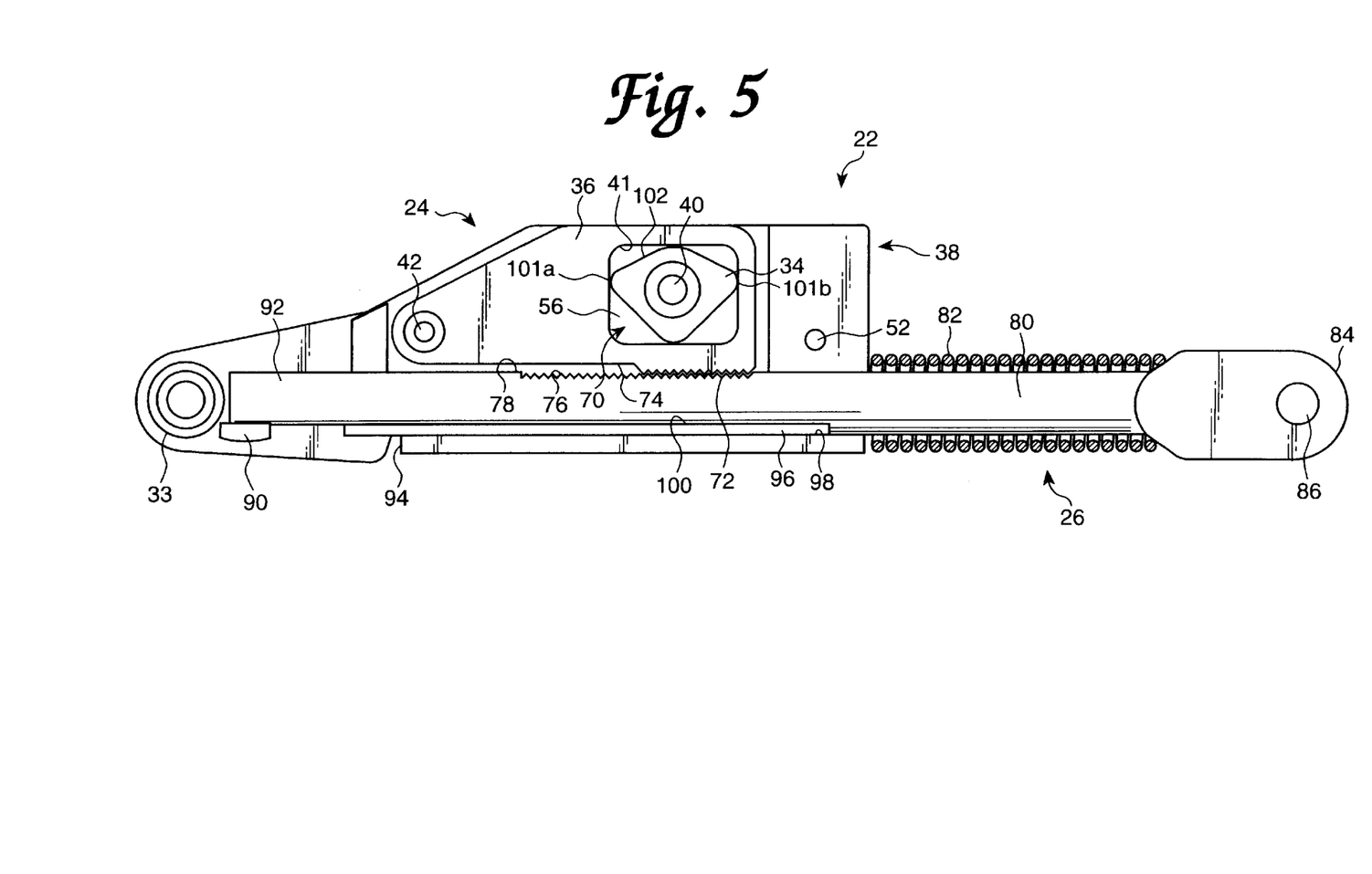
FIG. 5 of the drawings is a left side elevation view of the linear recliner assembly with some components of a protective structure removed to show a pawl engaged for locking the seat back assembly in position.
Figure 6:
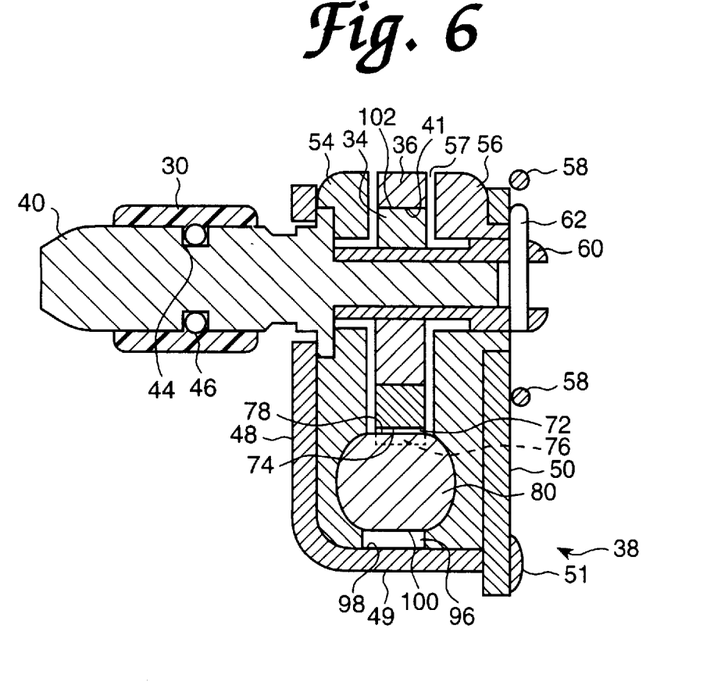
FIG. 6 of the drawings is a sectional view taken along line 6—6 of FIG. 2.
Figure 7:
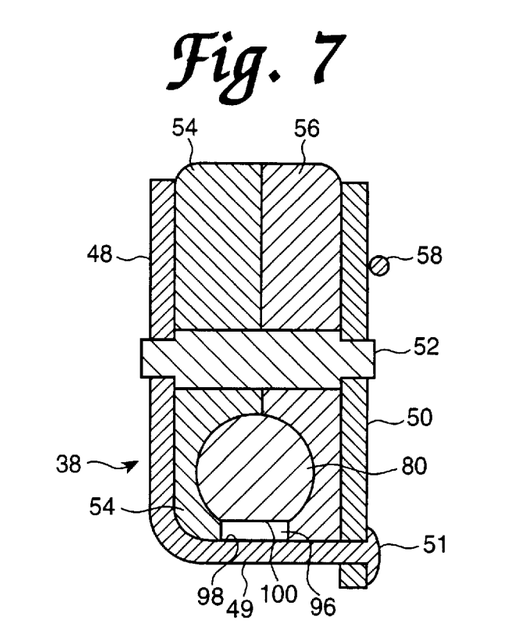
FIG. 7 of the drawings is a sectional view taken along line 7—7 of FIG. 2.
Figure 8:
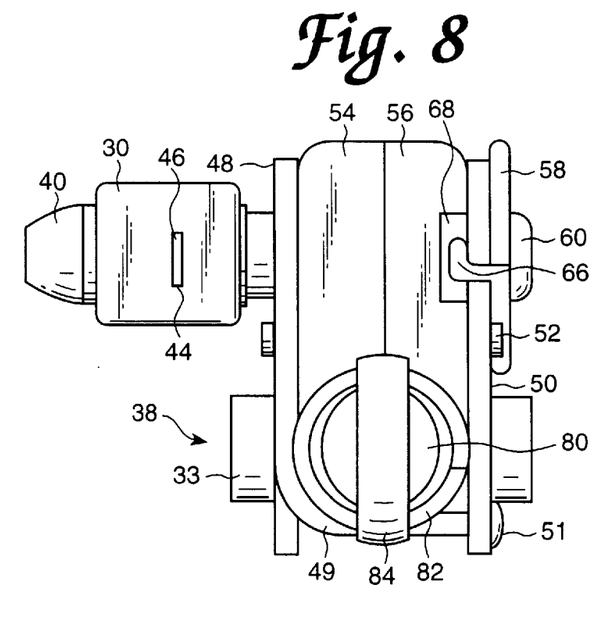
FIG. 8 of the drawings is a front view of the linear recliner assembly.

As shown in FIGS. 2, 3 and 5, the linear actuator assembly 22 comprises two main components; namely, a manually releasable locking mechanism 24 and a linearly movable control rod mechanism 26. The linear actuator assembly 22 is pivotally attached to the frame structure of the seat cushion 12 by a suitable bolt 32 passing through a connecting bushing 33 to support the recliner assembly 20. The connecting bushing 33 also acts as a spacer to keep the members of the actuator assembly 22 properly positioned.

Figure 10:
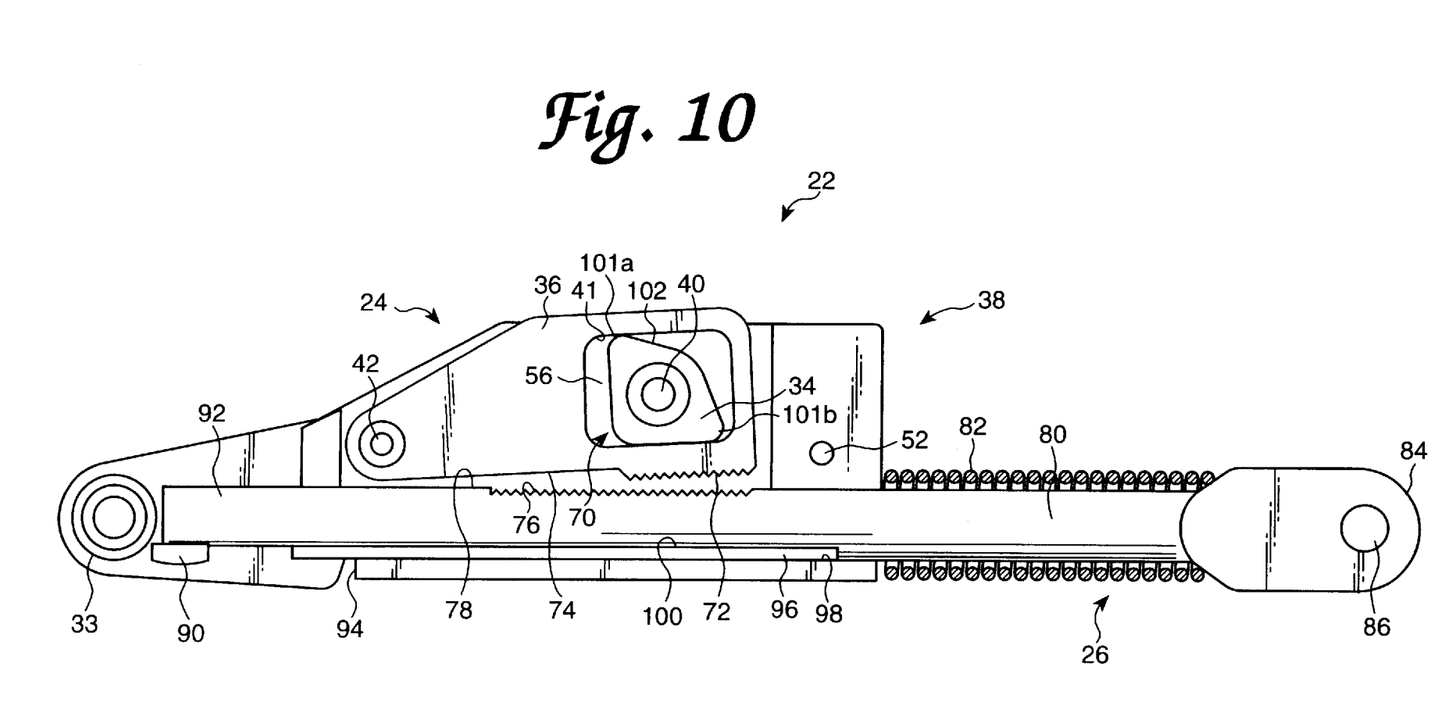
FIG. 10 of the drawings is a left side elevation view of the linear actuator with some components of the protective structure removed to show the pawl unlocked and disengaged for movement of the seat back assembly.

The locking mechanism 24 comprises a release member 30 with a handle 28, a rotatable camming member 34, and a pawl 36 that interacts with the control rod mechanism 26 within a protective housing 38. The locking mechanism components 30 and 34 are interconnected by a shaft or handle pivot pin 40 that extends through a mid-portion of the housing 38 and locks the members into position. The pawl 36 is centrally mounted on the pivot pin 42, with the camming member 34 being mounted within the pawl 36, as shown in FIGS. 5 and 10.

The housing 38 comprises a left body member 48 with a right-angled bottom surface 49, and a flat right body member 50 held together by a spacing connection rivet 52 and the pivot pin 42. The bottom surface 49 of the left body member 48 contains a series of three spaced, stake-like protrusions 51 that attach the left body member 48 to the right body member 50. The interior of the housing 38 comprises a left plastic spacer 54 and a right plastic spacer 56 which are shaped to provide a protective operating slot 57 for the pawl 36.

The handle 28 fits into an attachment groove 44 on the handle pivot pin 40 and is attached to the pin 40 by a formed spring clip 46 which secures the handle 28 to the handle pivot pin 40.

The release member 30 is forwardly biased by a torsional biasing element in the form of a spring 58, thus requiring a positive upwardly movement of the handle 28 to operate the locking mechanism 24 and unlock the seat back 18. As shown best in FIG. 3, a sharply bent inner end 62 of the elastic spring element 58 engages an opening 64 through a sleeve member 60 and through the pivot pin 40 to secure the pivot pin 40 in place. A hooked outer end 66 of the spring 58 is connected to a retaining notch 68 on the right body member 50 of the housing 38 to maintain proper operating tension on the spring 58.

Sleeve member 60 is mounted on pivot pin 40 to journal and secure the pivot pin 40 within the housing 38.

Now referring to FIG. 5, the camming member 34 is centrally mounted on the pivot pin 40, and is positioned centrally within a generally rectangular shaped aperture 70 of pawl 36. Pawl 36 has a series of engagement teeth 72 on a bottom surface 74. The camming member 34 has peripheral engagement surfaces which are complementary with the inner periphery surfaces or cam follower surfaces 41 of the aperture 70 such that camming member 34 remains in continuous engagement as the pawl 36 is moved between the releasably engaged position and the released position. The engagement between the camming member 34 and the cam follower surface 41 of aperture 70 is preferably a four-point engagement which controls the movement of the pawl 36. This relationship insures a favorable force transmittal of the forces urging reclining movement of the seat back 18 to be transmitted between the interengaging teeth 72 and 76 directly through the camming member 34 to the housing 38 and seat cushion 12.

The control rod mechanism 26 comprises an actuating rod 80 and a compressed spring 82. Actuating rod 80 has a series of engagement teeth 76 on an upper surface 78 which are complementary to the engagement teeth 72 of pawl 36. Spring 82 provides an expansion force that, when the actuating rod 80 is unlocked and released, forces the seat back 18 to pivot forwardly unless it is restrained or forced to pivot rearwardly by the action of the user. When the actuating rod 80 is unlocked and the spring 82 allowed to move, a forward end 84 of the actuating rod 80 that is attached to the recliner assembly 20 through an opening 86 and a pin-like attaching element 88, will move and cause the seat back arm member 23 to also move accordingly, and pivot the seat back 18 about a seat back pivot point 89. The allowable range of linear movement of the actuating rod 80 is limited by a flattened lower portion 90 of a rearward end 92 of the actuating rod 80, which inhibits further motion of the rod 80, when it engages a stop 94, that extends from the bottom of the housing 38.

A flat plastic runner 96 along an inner bottom surface 98 of the housing 38 is positioned beneath the rod 80. The runner 96 keeps the engagement teeth 76 on the upper surface 78 of the rod 80 turned upwardly and properly oriented for complete meshing with the engagement teeth 72 of the pawl 36 when the locking mechanism 24 is in its releasably locked position. A smooth bottom surface 100 of the rod 80 is also flat, such that it slides smoothly along the runner 96 when the rod 80 is undergoing forward or rearward linear movement. This interengagement insures that the rod 80 cannot have a rotational movement about its longitudinal axis.

It can be seen that during a normal use of the seat, the spring 58 serves to bias the handle 28 such that it is forced into its locked position, so that seat back 18 is retained in a specific reclining position within the range of reclining positions available.

Figure 9:
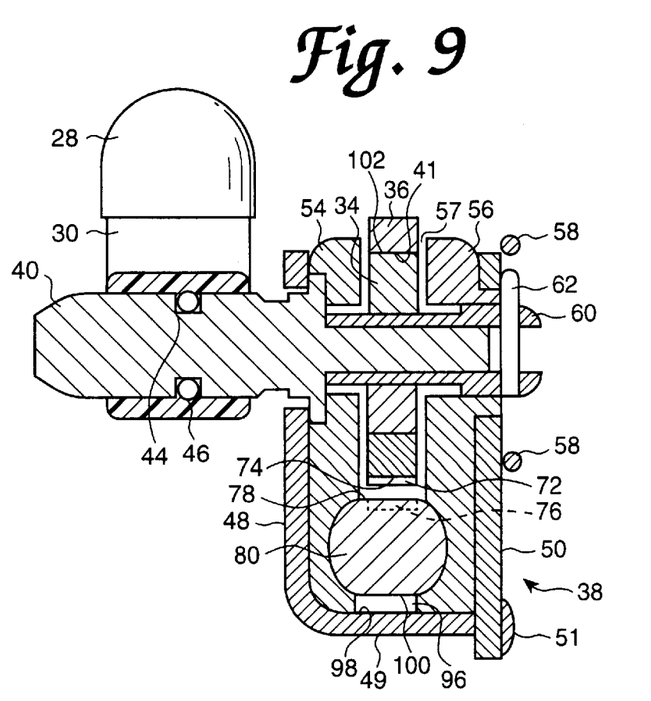
FIG. 9 of the drawings is a sectional view taken along line 6—6 of FIG. 2 with the pawl unlocked and disengaged for movement of the seat back assembly.

When the user seated on the seat cushion 12 decides to adjust the reclining position of the seat back 18, the user simply reaches down and pulls upwardly on handle 28 moving the release member 30 from its locking position into its releasing position. As shown in FIGS. 9 and 10, when the handle 28 is raised upwardly, the resulting pivotal movement of the camming member 34 causes the pawl 36 to pivot slightly counter-clockwise about the pivot pin 42. This results in the engagement teeth 72 of the pawl 36 disengaging from the corresponding series of engagement teeth 76 of the actuating rod 80, thus releasing the actuating rod 80 and control rod mechanism 26 for linear movement.

Rearward pivotal movement of the seat back 18 through the range of positions provided is accomplished by the user leaning or pushing back and moving the seat back 18 against the bias of the coil spring 58. Once the desired reclining position is obtained, the user simply releases the handle 28, allowing the release member 30 to be returned from its releasing position into its locked position, by the coil spring 58, thus moving the pawl 36 from its released position into its releasably locked position.

When the handle 28 is released, the bias force of the coil spring 58 will cause the handle 28 to move downwardly and pivot in the counterclockwise direction as viewed in FIG. 1. As the handle 28 moves downwardly it reverses the unlocking and disengaging process previously described, resulting in the recliner assembly 20 being locked in place.

FIGS. 5 and 10 show when the free end of the handle 28 is lifted upwardly, the camming member 34 is rotated in a clockwise manner as viewed in FIGS. 5 and 10. During this movement, an upper left portion or corner 102 of the camming member 34 will make contact with an upper portion of the cam follower surface 41 of the pawl 36, causing the pawl 36 to pivot slightly in a counter-clockwise manner, as viewed in FIG. 10, about the pivot pin 42. As long as the handle 28 is raised upwardly, the pawl 36 will remain disengaged, thus keeping the recliner assembly 20 unlocked.

During the movement of the camming member 34 between the locked and unlocked positions, only the upper portion 102 of the cam element 34 will be in an engaged relationship with the peripheral wall defining the cam follower surface 41; namely, wherein the upper portion 102 engages the upper surface of the cam follower surface 41 to positively effect movement of the locking and releasing member 36 from its locked position to its unlocked position. This same engagement relationship is maintained as the camming member 34 is moved between its unlocked position, as shown in FIG. 10, back into its locked position, as shown in FIG. 5, by the bias of spring 58.

While the invention has been described in connection with what is presently considered to be the most practical and preferred embodiment of the invention, it is to be understood that the invention is not limited to the disclosed embodiment but, on the contrary, is intended to cover various modifications and equivalent arrangements included within the scope of the appended claims.

What is claimed is:

1. A linear recliner assembly for installation on a vehicle seat assembly, the vehicle seat assembly having a seat cushion and a seat pivotally mounted to the seat cushion for forward and rearward reclining movement, the linear recliner assembly comprising:
   a housing constructed and arranged to be mounted to said seat cushion when said recliner assembly is installed;
   an actuating rod with a set of teeth formed thereon slidably mounted to said housing at one end thereof and having an opposite end that pivotally connects to said seat back when said recliner assembly is installed, said actuating rod being biased to urge the seat back through the forward reclining movement thereof when said recliner assembly is installed;
   a pivotally mounted pawl biased into pivotal engagement with the actuating rod, said pawl having a set of teeth formed thereon and a generally rectangular aperture formed therein that defines an engagement surface;
   a rotatable camming member having a quadrilateral configuration with opposing upper and lower corners and opposing forward and rearward corners, said camming member being configured such that rotation of said camming member causes one of the corners thereof to engage the engagement surface of said aperture in a camming relationship so as to move said pawl between a releasably engaged position wherein the teeth of said pawl are releasably intermeshed with the teeth of said actuating rod to prevent reclining movements of the seat back when said recliner assembly is installed and a released position wherein the teeth of said pawl are disengaged from the teeth of said actuating rod to allow reclining movements of the seat back when said recliner assembly is installed, wherein when said recliner assembly is installed and said pawl is in said engaged position a force applied to said seat back is transmitted to said seat cushion through said camming member.

2. A linear recliner assembly according to claim 1, wherein said actuating rod has a stop disposed at a forward portion of the housing, said stop being constructed and arranged to prevent further rearward movement of said actuating rod relative to said housing to thereby restrict further forward reclining movement of said seat back when said recliner assembly is installed.

3. A vehicle seat assembly comprising:
   a seat cushion;
   a seat back pivotally mounted to said seat cushion for pivotal forward and rearward reclining movement relative to said seat cushion;
   a linear recliner assembly comprising:
   a housing mounted to said seat cushion;
   an actuating rod pivotally connected to the seat back at one end thereof and slidably mounted to the housing at an opposite end thereof, said actuating rod being biased to urge the seat back through the forward reclining movement thereof;
   a pivotally mounted pawl biased into pivotal engagement with the actuating rod, said pawl having a generally rectangular aperture that defines an engagement surface;
   a rotatable camming member having a quadrilateral configuration with opposing upper and lower corners and opposing forward and rearward corners, said camming member being configured such that rotation of said camming member causes one of the corners thereof to engage the engagement surface of said aperture in a camming relationship so as to move said pawl between a releasably engaged position wherein said pawl engages said actuating rod to prevent reclining movements of said seat back and a released position wherein said pawl is disengaged from said actuating rod to allow reclining movements of said seat back; wherein when said pawl is in said engaged position a force applied to said seat back is transmitted to said seat cushion through said camming member.

4. A vehicle seat assembly according to claim 3, wherein said actuating rod has a set of teeth formed thereon, and said pawl has a set of complementary teeth formed thereon, said teeth of said pawl being engaged with said teeth of said actuating rod in a releasably intermeshed relationship when said pawl is in said releasably engaged position.

5. A vehicle seat assembly according to claim 4, wherein said actuating rod has a stop disposed at a forward portion of the housing, said stop being constructed and arranged to prevent further rearward movement of said actuating rod relative to said housing to thereby restrict further forward reclining movement of said seat back.

* * * * *